Inventor
GEORGES VALENSI
BY
Holcombe, Wetherill & Brisebois
Attorneys

Inventor
GEORGES VALENSI
By
Holcombe, Wetherill & Brisebois
Attorneys

Inventor
GEORGES VALENSI
By
Holcombe, Wetherill & Brisebois
Attorneys

Oct. 13, 1970 G. VALENSI 3,534,153

COLOR TELEVISION SYSTEM

Filed Feb. 6, 1967 10 Sheets-Sheet 4

Inventor
GEORGES VALENSI
By
Holcombe, Wetherill & Brisebois
Attorneys

Inventor
GEORGES VALENSI
By
Holcombe, Wetherill & Brisebois
Attorneys

Oct. 13, 1970 G. VALENSI 3,534,153

COLOR TELEVISION SYSTEM

Filed Feb. 6, 1967 10 Sheets-Sheet 6

Inventor
GEORGES VALENSI
By
Holcombe, Wetherill & Brisebois
Attorneys

Oct. 13, 1970 G. VALENSI 3,534,153

COLOR TELEVISION SYSTEM

Filed Feb. 6, 1967 10 Sheets-Sheet 7

Inventor
GEORGES VALENSI
By
Holcombe, Wetherill & Brisebois
Attorneys

Inventor
GEORGES VALENSI
By
Holcombe, Wetherill & Brisebois
Attorneys

Inventor
GEORGES VALENSI
By
[signature]
Attorneys

Inventor
GEORGES VALENSI
By
Holcombe, Wetherill & Brisebois
Attorneys

3,534,153
COLOR TELEVISION SYSTEM

Georges Valensi, 3 Rue des Chaudronniers, Geneva, Switzerland

Filed Feb. 6, 1967, Ser. No. 614,281
Claims priority, application France, Feb. 5, 1966, 48,564; Mar. 22, 1966, 54,412; Apr. 12, 1966, 57,192; July 1, 1966, 67,828
Int. Cl. H04n 9/02
U.S. Cl. 178—5.4 16 Claims

ABSTRACT OF THE DISCLOSURE

This invention relates to a television system in which only the standard luminance signal (Y) is transmitted for a white or grey element of the televised scene, whereas a first weighted luminance signal ($Y'=Y/S$), (with S being the degree of saturation of the color of said element) and a second hue signal (C) characterizing the hue of said color and being preferably a voltage proportional to the number of the sector related to said hue in a mapped Newton color circle, are transmitted for a colored element of the scene.

At the receiver, two small cathode ray tubes, having respectively a white fluorescent screen and a trichrome fluorescent screen, produce a detailed black and white picture corresponding to the luminance signal (Y or Y'), and a coarse picture in saturated colors corresponding to the hue signal (C)—these two pictures being produced in synchronism by means of a synchronizing device, and being superposed upon a projection screen by means of an optical device located between said fluorescent screens and said projection screen.

SUMMARY

The present invention concerns an improved color television system as compared to the known systems based on the mapping of a color diagram in sectors related to various colors, such as the system described in French Pat. No. 1,170,895, or in U.S. Pat. No. 2,920,131. The system in accordance with the present invention not only utilizes the information capacity of the transmission channel, connecting the transmitting and receiving stations, much better than the known systems mentioned above, but also affords a much greater variety of colors in the colored parts of the picture reproduced at the receiving station, and provides moreover the certainty of reproducing in pure white or grey, the colorless elements of the televised scene.

DESCRIPTION OF THE DRAWING

Apparatus for carrying out the present invention is described hereafter, with reference to the accompanying drawings, in which:

FIG. 1*a* reproduces the color triangle of the International Illumination Committee in orthogonal coordinates (*xy*), as mapped in case of the known color television system described in French Pat. No. 1,170,895, or in U.S. Pat. No. 2,920,131. In this figure the central sector corresponds to white; sectors 1, 6, 7, 12, 13, 18, 19, 24 and 25 correspond to colors of low saturation; sectors 2, 5, 8, 11, 14, 17, 20, 23 and 26 correspond to colors of average saturation; and sectors 3, 4, 9, 10, 15, 16, 21, 22 and 27 correspond to colors of high saturation.

FIG. 1*b* (left) reproduces the Newton color circle as mapped in case of the known color television system described in the copending U.S. patent application Ser. No. 428,130, filed Jan. 26, 1965, corresponding to the first addition (dated Feb. 5, 1964) of French Pat. No. 1,428,480. In this figure the central sector corresponds to white; sectors 1, 3, 5, 7, 9, 11, 13, 15 and 17 correspond to colors of low saturation; sectors 2, 4, 6, 8, 10, 12, 14, 16 and 18 correspond to colors of great saturation; and the symbols have the following significances: PV, violet-purple—PR, red-purple—R, red,—O, orange—J, yellow—VJ, yellowish green—V, green—BV, bluish green (or cyan)—B, blue.

In both cases (FIG. 1*a*, or FIG. 1*b*), the coded chrominance signal characterizing the chromaticity to be reproduced at the receiving station is an electric voltage proportional to the number of the particular sector corresponding to this color in the mapped color-diagram.

In the Newton color circle (FIG. 1*b*, right), the "chromaticity" (or color) represented by point C is defined by its hue, which corresponds to the phase (*p*) of vector $\overline{OC}$ related to the reference axis O*x*, and by its degree of saturation, which corresponds to the amplitude (*a*) of vector $\overline{OC}$, the center O of the circle corresponding to "pure white" (which, conventionally, is "Illuminant C" of the International Illumination Committee).

Figure 1A:
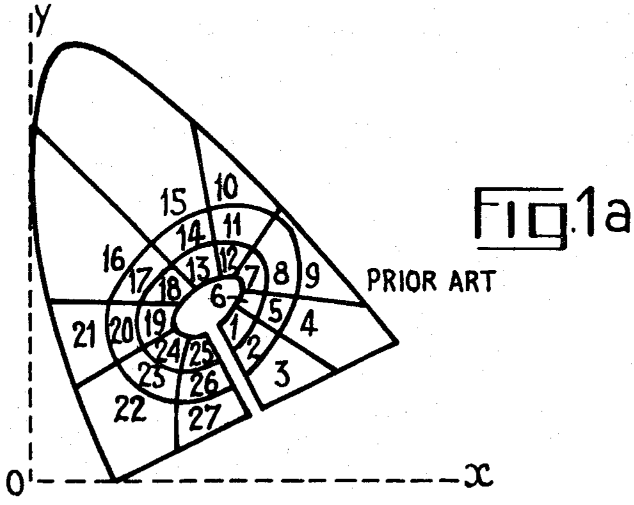
FIGS. 1*a* and 1*b* are diagrams showing how, in known color television systems the color-diagram is mapped in sectors related to various chromaticities, a chromaticity being characterized by a group of two parameters, such as the hue and the saturation degree.
Figure 1B:
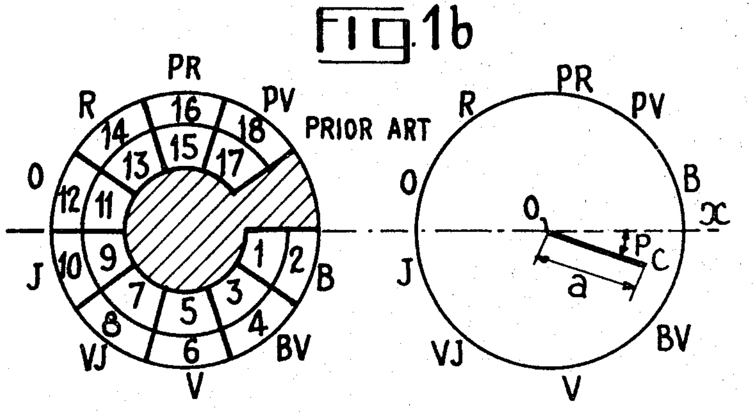

The known color television system based on the mapped color diagrams of FIG. 1*a* or FIG. 1*b*, are convenient only for certain industrial applications requiring only a small number of distinct colors for the reproduction of the picture of the televised scene.

Munsell's work in colorimetry has proven that the normal human eye requires 20 different hues at least, and at least 3 saturation degrees for satisfactory color recognition. This implies discrimination between $3\times20=60$ different chromaticities, and it is hardly possible to discriminate 60 amplitude levels (at the output of a closed circuit having a linear amplitude range of 40 decibels) when use is made of the color television systems illustrated by FIGS. 1*a* or 1*b*.

Figure 2A:
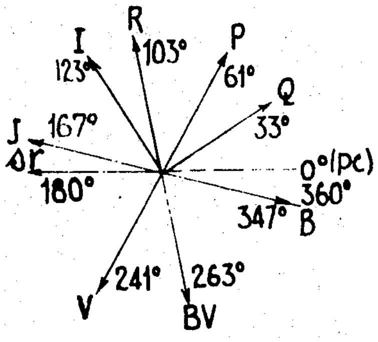
FIGS. 2 and 2*a* illustrate the Newton color circle mapped in 20 useful sectors related to the 20 essential hues corresponding to the conditions of picture viewing at the receiving station, the sector (hatched on the drawing), between the useful sectors bearing numbers 1 and 20, not being used.
Figure 2:
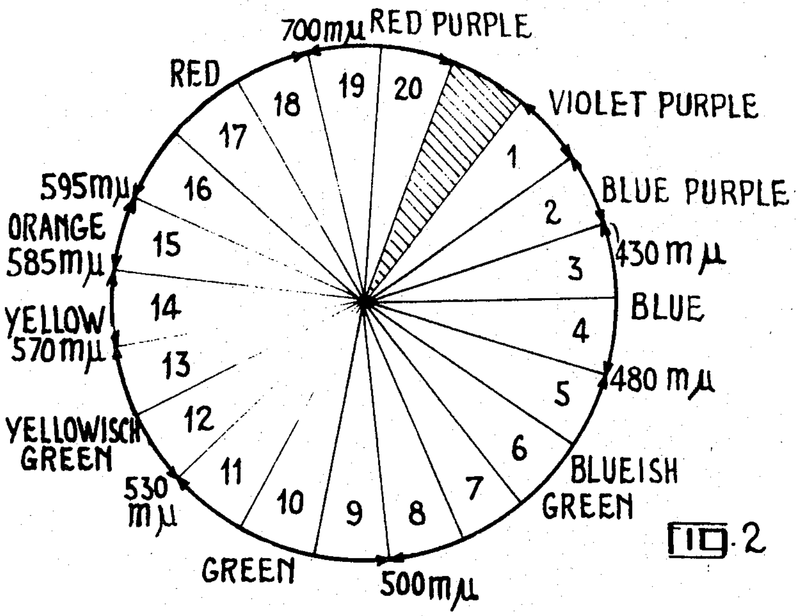

In accordance with the first feature of the present invention, the Newton color circle is mapped in at least 20 useful sectors corresponding to the 20 essential hues for average viewing conditions in accordance with Munsell's work in colorimetry, plus one unused sector, separating the two useful sectors numbered 1 and 20, and shown hatched on FIG. 2.

FIG. 1–*c* illustrates schematically how the transmission channel (between the transmitting and receiving stations) may be used in case of the color television system in accordance with the invention. For the clarity of the drawing, the frequency bands alloted to the luminance signal ($Y$ or $Y'=Y/S$) and to the chrominance signal ($pCm$) are shown separated, although generally the spectra of said signals are interlaced, the frequency of the color-carrier ($pc$), generated by oscillator ($Gpc$) of FIG. 3, being an odd multiple of half the horizontal sweep frequency.

Figure 1C:
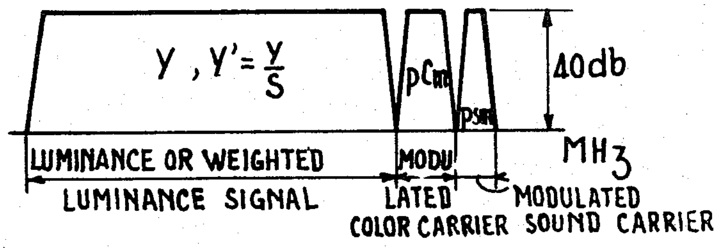
FIG. 1*c* is a diagram showing the use of the transmission channel in the color television system according to the invention.

On FIG. 1c, ($psm$) is the transmitted sound signal, constituted by a sound-carrier, the frequency of which is modulated by the sounds(s) accompanying the pictures.

Figure 3:
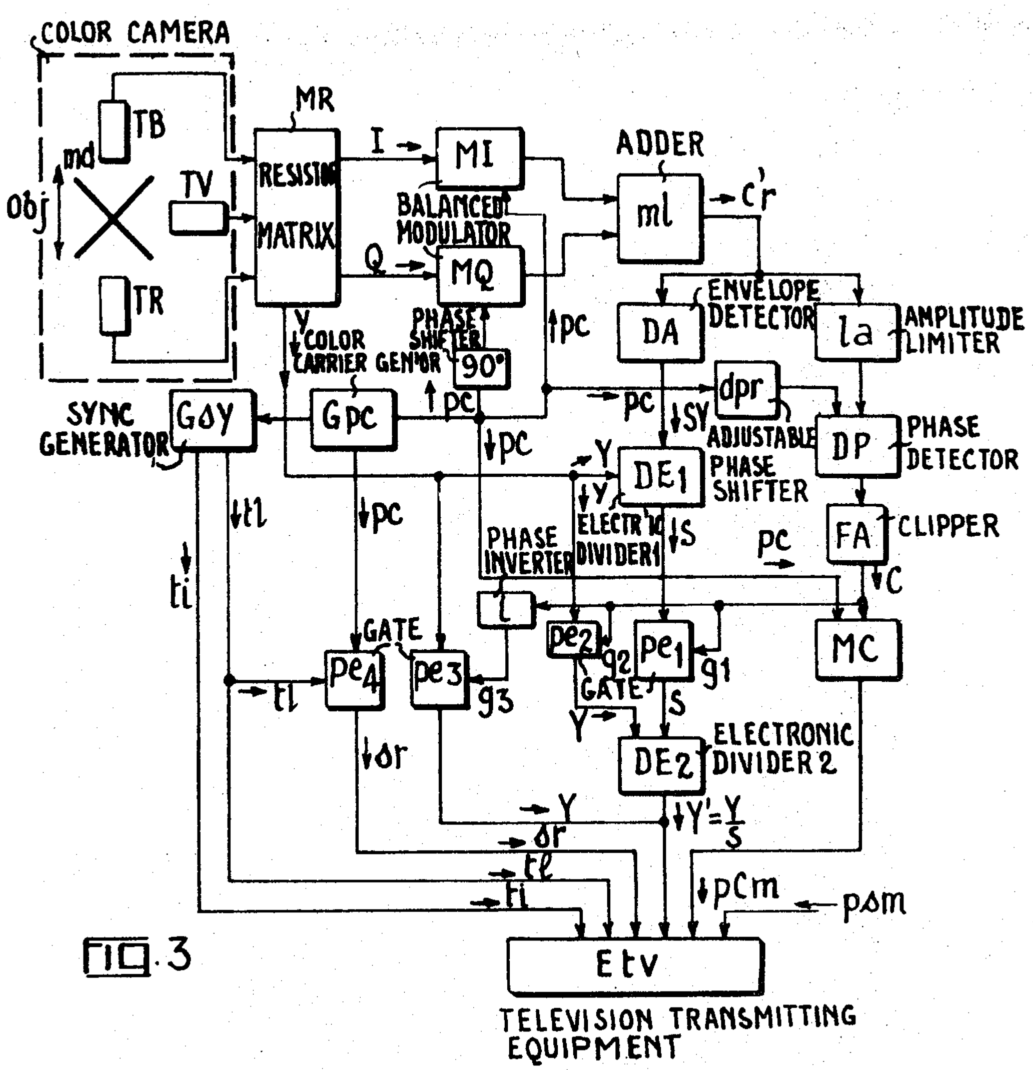
FIG. 3 illustrates a first embodiment of the transmitting station of said improved system in accordance with the invention.

FIG. 3 shows a first embodiment of the transmitting station of the color television system in accordance with the present invention, and based on FIG. 2 for chrominance encoding. ($Obj$) is the objective of the pick-up camera, which comprises 3 cathode ray tubes (TB, TV, TR) receiving, upon their photosensitive targets, through dichroic mirrors ($md$), three pictures of the televised scene, respectively blue, green and red. These cathode ray tubes produce the primary color signals (B, blue—V, green—R, red), applied to the resistor matrix (MR), at the output of which are obtained: the luminance signal $$(Y=0.11B+0.59V+0.30R)$$

and the chrominance components (I and Q) of the American color television system N.T.S.C. It would be also possible to derive, from the primary color signals (B, V, R) the chrominance components, ($B-Y$) and ($R-Y$), of the French color television system (SECAM) or of the German color television system (PAL). The above mentioned color camera and resistor matrix (MR) are those of the well known NTSC color television system as described, for example, in the "Principles of Color Television" by the Hazeltine Laboratories Staff, published by John Wiley & Sons, Inc., New York, in 1956, on pages 291 to 293, and pages 157 to 161, respectively.

Oscillator ($Gpc$) (like the one described for example on pages 17–82 and 17–83 and illustrated by FIG. 17–56 of the "Television Engineering Handbook" published by McGraw-Hill Book Co., Inc., New York, in 1957) generates the color carrier (sinewave of frequency $pc$), amplitude modulated in quatrature by the chrominance components (I, Q), by means of modulators (MI, MQ) (which are conventional balanced modulators generating suppressed carrier amplitude modulated waves illustrated, for example, by the FIGS. 17–50 or 17–51 on pages 17–77 to 17–79 of the above mentioned "Television Engineering Handbook"), "90°" designates a phase shifter inserted between ($Gpc$) and (MQ) and producing a phase shift of 90 degrees. The modulated signals are applied to a mixer ($ml$) (which can be constituted by a simple adding circuit), the output of which is a chrominance wave $G'r$):

$$G'_r=Q \text{ sine } (2\pi pc+33°)+I \cos (2\pi pc+33°)$$

It has been agreed to assign the following amplitudes in the Newton color circle, to the vectors $\overline{OB}$, $\overline{OV}$, $\overline{OR}$ representing the primary colors (B, V, R):

$$0.447 \text{ for } \overline{OB},\ 0.593 \text{ for } \overline{OV},\ 0.632 \text{ for } \overline{OR}$$

in order that the sum of these three vectors is zero, and corresponds to the center (O) of the color-circle. On the other hand, it has been agreed that the "conventional pure white," corresponding to this center of the color-circle, has the following relative proportions: 0.11 for blue B, 0.59 for V, green, 0.30 for R, red. Consequently, the amplitude of the chrominance wave ($C'_r$) is, in fact, the product of the degree of saturation (S) of the color by the luminance signal (Y); the phase of said chrominance-wave ($C'_r$) characterizes the hue of the color, and corresponds to "hue-signal (C)."

FIG. 2a shows the phases of the vectors representing various hues (P, purple—R, red—J, yellow—V, green, BV, bluish green—and B, blue) with reference to the phase ($pc$) of the color carrier taken as origin. Vector ($sr$) corresponds to the "color burst" transmitted at the end of each line synchronizing pulse ($t_1$) in the American color television system (N.T.S.C.). Vectors I and Q correspond to the chrominance components (I, Q) obtained at the output of the resistor matrix (MR) of FIG. 3. Looking simultaneously at FIG. 2 and at FIG. 2a, it appears that the unused (hatched) sector of the color-circle (FIG. 2) corresponds to vector (P) (purple) on FIG. 2a, the phase of which is 61 degrees, referred to the phase of the color carrier ($pc$) generated by ($Gpc$) on FIG. 3. The adjustable phase shifter ($dpr$) of FIG. 3 serves to compensate this phase shift of 61 degrees, and is inserted between ($Gpc$) and (DP), which is a phase detector for producing the hue signal (C), as explained hereafter.

The chrominance wave ($C'_r$), obtained at the output of mixer ($ml$) on FIG. 3, is applied to amplitude or envelope detector (DA) the output of which is an electric voltage (SY), the product of luminance signal (Y) and saturation signal (S). This voltage (SY) is applied to the first input of a first electronic divider ($DE_1$) well known from analog computer circuits and described, for example, on page 274 (FIGS. 8–37) of Samuel Seely's "Electron-Tube Circuits," second edition, published by the McGraw-Hill Book Co., Inc., New York, in 1958, which simultaneously receives, at its second input, the luminance signal (Y) coming out of resistor matrix (MR). The output of ($DE_1$) is therefore a voltage $SY/Y=S$, which is the saturation signal (S).

The chrominance wave ($C'_r$) is applied, through amplitude limiter ($la$), to the first input of a conventional phase detector (DP), which receives, at its second input, through adjustable phase shifter ($dpr$), the color carrier ($pc$) produced by ($Gpc$). By proper adjustment of ($dpr$) an electric voltage (hue signal C) proportional to the number of the sector representing (on FIG. 2) the hue of the color to be reproduced at the receiving station is obtained at the output of (DP). This hue signal (C) goes through amplitude filter (FA), before being applied to amplitude modulator (MC), which also receives the color carrier ($pc$)—to produce the chrominance signal ($pCm$), applied to the so-called "channel-transmitting equipment ($Etv$), which comprises adding circuits to form by addition of the elementary signals $t_1$, $t_1$, $sr$, $Y$ or $Y'$, $pCm$ and $psm$ a composite video signal and eventually transmitter equipment comprising a carrier generator and modulator for modulating said carrier by this composite signal." Amplitude filter (FA), which can be constituted by a conventional amplitude limiter, i.e. a circuit providing both base and peak clipping, cancels any value of hue signal C, either less than 1, or greater than 20, and which would correspond to the *unused* sector of the color-circle (hatched on FIG. 2).

On FIG. 3, ($pe_1$) and ($pe_2$) are electronic gates normally closed, because of the bias voltage (negative) applied to their gating inputs ($g_1$, $g_2$). ($pe_3$) is an electronic gate, normally open, but which closes when a positive voltage is applied, to phase or polarity inverter ($i$), which feeds the gating input ($g_3$) of said gate ($pe_3$).

In case of a white or gray part of the televised scene, the hue signal (C) is zero and gates ($pe_1$) and ($pe_2$) are closed, whereas gate ($pe_3$) is open, and, through it, the luminance signal (Y) reaches the channel transmitting equipment ($Etv$). In case of a colored part of the televised scene, hue signal (C) has a positive value (comprised between 1 and 20), which, applied to the gating inputs ($g_1$, $g_2$) of electronic gates ($pe_1$) and ($pe_2$), overcomes their negative bias voltage, whereas, through phase inverter ($i$), it closes electronic gate ($pe_3$). Therefore, luminance signal (Y) and saturation signal (S) can reach the two inputs of a second electronic divider ($DE_2$) (which may use the same circuit as $DE_1$), at the output of which the "weighted-luminance-signal ($Y'=Y/S''$) is obtained. This signal corresponds to the amount of white light, which, added to a light of a saturated color corresponding to hue-signal (C), would precisely reproduce well the color of the part of the televised scene being scanned at the considered instant. At this instant, the weighted luminance signal (Y′) will reach the channel transmitting equipment (E*tv*), instead of luminance-signal Y.

On FIG. 3, (G*sy*) is the generator of synchronizing signals of sync generator of a known type, controlled by the color carrier generator (G*pc*), in the following manner. For the 315 line pictures assumed hereabove as an example only, the frequency of the color carrier is:

$$pc=3,858,750=15,750\times245=50\times315\times245$$

50 being precisely the number of fields per second, and 315 the number of lines per picture. Also: 315=5×9×7, and 245=7×7×5. Therefore, the sync-generator (G*sy*), energized by (G*pc*), comprises 3 successive frequency dividers (division by 7, then by 7, then by 5) for producing the intermediate frequency (15,750). It comprises also a frequency divider (division by 2) for producing the line frequency (7875), and, finally, three successive frequency-dividers (division by 5, then by 9, then by 7) for producing the field frequency (50). 7875 line-synchronizing pulses ($t_1$) each second, and 50 field-synchronizing signals ($t_i$) per second are thus obtained. These pulses ($t_1$) and these signals ($t_i$) synchronize the horizontal and vertical motions of the electron beams of the camera tubes (TB, TV, TR of FIG. 3). They also reach the channel transmitting equipment (E*tv*).

In case of pictures having 405 lines with 50 interlaced fields per second, the "intermediate frequency," derived from the generator of color carrier, should be:

$$50\times405=20,250 \text{ cycles per second}$$

A divider by 2 will produce the line frequency; a cascade of dividers by 5, then by 9, then by 9 again will produce the frame frequency (50), because 405=5×9×9.

During the back porch of each line sync pulse ($t_1$), a few periods of the unmodulated color carrier (*pc*) generated by (G*pc*) go through electronic gate ($pe_4$) which is then open due to pulse ($t_1$) applied to its gating input ($g_4$). These periods of wave (*pc*) constitute the "color-burst" (or reference signal *sr*) applied to the channel transmitting equipment (E*tv*). The hue signal (C) modulates the color carrier (*pc*) by means of a compatible amplitude modulator (MC), the lower side-band (*p*C*m*) alone being applied to equipment (E*tv*), which receives also the synchronizing signals ($t_i$) and pulses ($t_1$), as well as either the luminance signal (Y) or the weighted luminance signal ($Y'=Y/S$). This equipment receives also the modulated sound carrier (*psm*) produced by a frequency modulator, not shown on FIG. 3.

Figure 4:
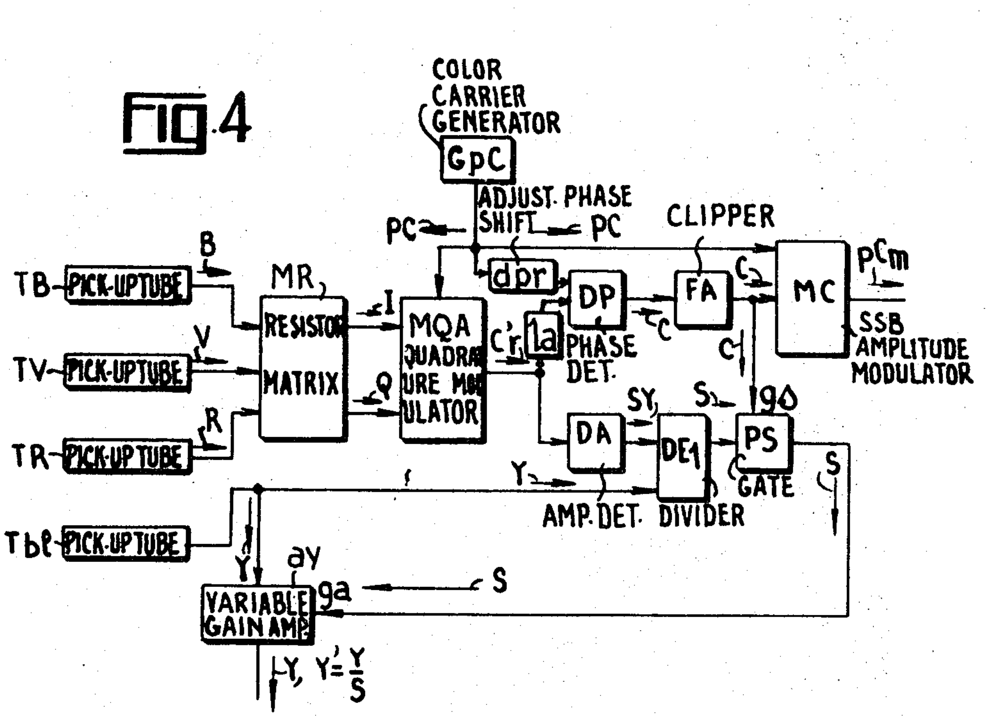
FIGS. 4 and 4*a* illustrate a second embodiment of said transmitting station.

FIG. 4 shows another embodiment of the transmitting station of the color television system in accordance with the invention, and based on FIG. 2 for chrominance encoding.

Figure 4A:
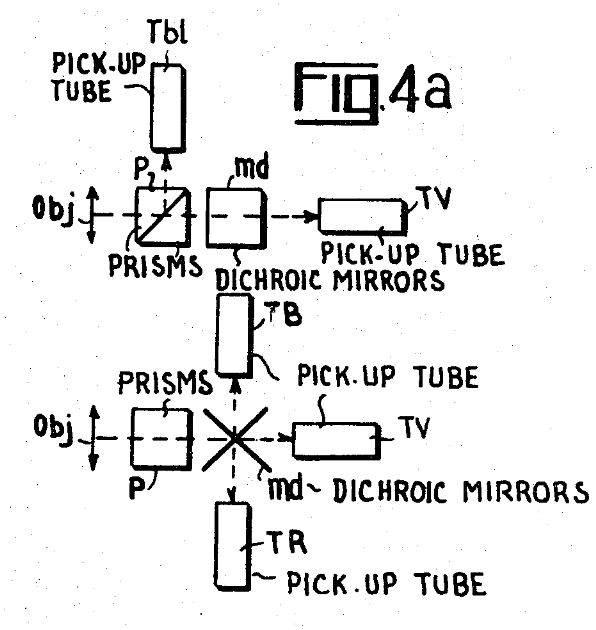

On FIG. 4, (TB), (TV), (TR) and (T*bl*) are four cathode ray tubes receiving respectively, through objective (O*bj*) 3 (blue, green and red) pictures of the televised scene, produced through dichroic mirrors (*md*), upon the photosensitive targets of (TB), (TV), (TR), and one white picture of the televised scene, produced through prism P, upon the photosensitive target of (T*bl*). The projection on a vertical plane (at top of FIG. 4*a*) shows, behind objective (O*bj*), the prism P illuminating tube (T*bl*), and also shows the position occupied by the dichroic mirrors (*md*). Cathode ray tube (TV), having an horizontal axis, is shown behind (*md*). Cathode ray tubes (TB) and (TR) having a horizontal axis, but which are perpendicular to the vertical plane of said projection, are not shown, in order to simplify the drawing. At the bottom of FIG. 4*a*, is a projection on an horizontal plane, which shows clearly the three tubes (TB), (TV), (TR) and the dichroic mirrors (*md*). The place occupied by prism P, between objective (O*bj*) and dichroic mirrors (*md*), is also shown, but the cathode ray tube (T*bl*) is not shown, in order to simplify the drawing.

On FIG. 4, the resistor matrix (MR) derives only the chrominance components (I, Q) from primary color signals (B, V, R), whereas the luminance signal (Y) is obtained directly at the output of tube (T*bl*). The voltages (I, Q) amplitude modulate the sine wave of frequency (*pc*) produced by (G*pc*), by means of "quadrature amplitude modulator (MQA)" which is built up of balanced modulators (MI) and (MQ), color carrier generator (G*pc*), phase shifter (90°) and mixer (*ml*) of FIG. 3, for example, and at the output of which the chrominance-wave (C′*r*) is obtained. This wave is applied, through amplitude limiter (*la*), to phase detector (DP), which receives also the color carrier (*pc*) through adjustable phase shifter (*dpr*). At the output of (DP) appears the hue signal (C), which goes through amplitude-filter (FA), before reaching amplitude-modulator (MC), for modulating the color carrier (*pc*) and so producing the chrominance signal (*p*C*m*) transmitted to the receiving station.

The chrominance wave (G′*r*) is also applied to amplitude detector (DA) to produce an electric voltage (SY) applied to electronic divider ($DE_1$). This divider receives also the luminance signal (Y) coming from tube (T*bl*), and it produces, at its output, the saturation signal (S), which is proportional to the degree of saturation of the color to be reproduced at the receiving station, at the considered instant.

(PS) on FIG. 4 is an electronic gate which is normally closed, except during the scanning of a colored part of the televised scene, because, then, the hue signal (C) (which is positive), overcomes the negative bias of the gating electrode (*gs*) of said gate (PS). For a white or gray part of the televised scene, gate (PS) is closed, and the luminance signal (Y) is amplified by a voltage controlled variable gain amplifier (*a*Y) with its maximum gain (i.e. with a gain corresponding to a zero voltage applied to its gain control input), before reaching the channel transmitting equipment (not shown on FIG. 4). For a colored part of the televised scene, the gate (PS) opens (under control of hue signal C, applied to electrode *gs*), and the saturation signal (S) appearing at its output is applied to the gain control input (*ga*) of amplifier (*ay*). The saturation signal (S) is being applied to the gain control input of amplifier (*a*Y) with such a polarity, that its gain is inversely proportional to the instantaneous value S of the saturation signal. Therefore, the output voltage of amplifier (*a*Y) is then $Y/S=Y'$, the "weighted luminance signal," which corresponds to a brightness reduced in proportion to the saturation of said color to be reproduced, and which corresponds to the amount of white light to be added to a light of the saturated color of hue (C′) to reproduce the desired color at the receiving station.

Figure 5:
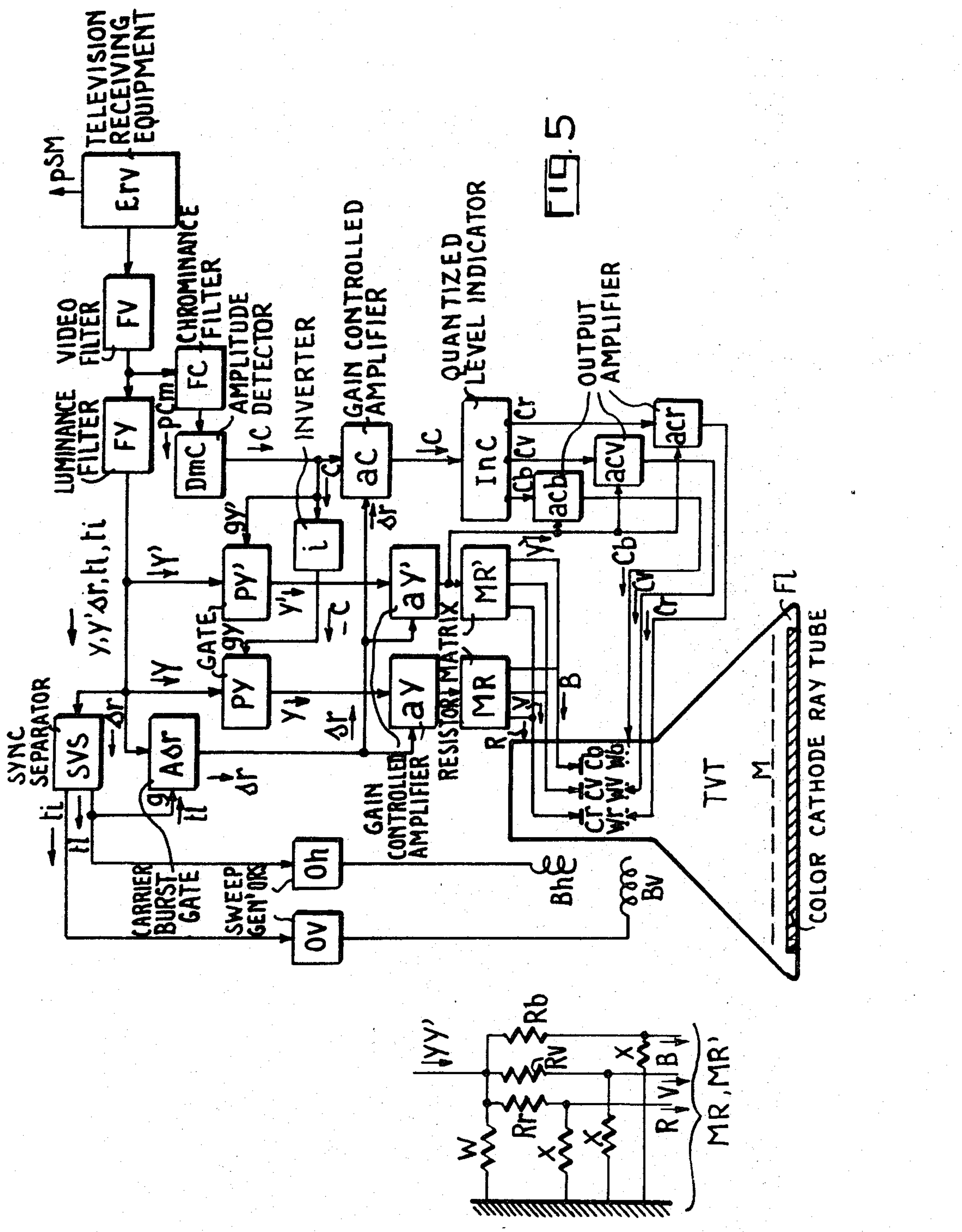
FIG. 5 illustrates the receiving station of the improved system in accordance with the invention.

FIG. 5 shows one embodiment of the receiving station of the color television system in accordance with the present invention. (E*rv*) is the channel receiving equipment, at the output of which frequency filter (FV) separates the video signal from the sound signal (*psm*).

Frequency filter (FY) separates the luminance signals (Y or Y′) associated with the line synchronizing pulses ($t_1$), the field synchronizing signals ($t_i$) and the "color-burst" (*sr*). Frequency filter (FC) separates the chrominance signal, modulated color carrier (*pcm*), which is applied to the amplitude detector (D*m*C), at the output of which the hue signal (C) is obtained.

(SVS) is the sync separator, at the output terminals of which the field-synchronizing signals ($t_i$) and the line-synchronizing pulses ($t_1$) are obtained. The bloc (A*sr*) is a color burst separator and comprises a narrow band filter tuned to the color carrier frequency (*pc*), an electronic gate whose signal input is coupled to the output of the narrow band filter and a gating signal generator receiving at its control input (*g*) the line sync pulses ($t_1$) and feeding the gating input of the gate with gating pulses whose duration corresponds substantially to the back porch of the line sync pulses.

(PY) is an electronic gate normally open, whereas (PY′) in an electronic gate normally closed, because an appropriate negative bias is applied to its gating electrode ($gy'$). In case of a color part of the televised scene, the positive hue signal (C) is, through inverting triode ($i$), applied to gating electrode ($gy$) and so closes gate (PY), while it directly opens gate (PY′). Therefore luminance signal (Y) cannot reach its amplifier ($a$Y), whereas weighted luminance signal (Y′), after having been amplified by amplifier ($a$Y′), reaches the resistor matrix (MR′). In case of a white or gray part of the televised scene, hue signal (C) does not exist, gate (PY′) remains closed, and through gate (PY), which is open, the luminance signal (Y), after amplification by ($a$Y), reaches resistor-matrix (MR).

Amplifier ($a$C) for hue signal (C), and amplifiers ($a$Y) and ($a$Y′) for the luminance signal (Y or Y′), are voltage controlled variable gain amplifiers, whose gain is a function of the color burst ($sr$) amplitude, the color burst being applied to their gain control inputs, in order to automatically compensate for the random time variations of the "reference-equivalent" of the transmission channel connecting the channel transmitting equipment (E$tv$, FIG. 3) of the transmitting station with the channel-receiving-equipment ($Er_v$, FIG. 5) of the receiving station.

(MR) and (MR′) are two identical resistor matrixes comprising, (as shown at the left of FIG. 5), 7 resistors (called $R_b$, $R_v$, $R_r$, X and W) which satisfy the following equations:

$$R_r+X=\frac{1}{3}\frac{W}{0.30};\ R_v+X=\frac{1}{3}\frac{W}{0.59};\ R_b+X=\frac{1}{3}\frac{W}{0.11}$$

As the red, green and blue components of the "conventional white" have relative values corresponding precisely to 30%, 59%, and 11%, any luminance signal (Y or Y′), applied at the input of the matrix resistor (MR or MR′), produces, at the 3 output terminals, three electric voltages (R, V, B) corresponding to the intensities of the red, green, blue components of the *white light* to be produced on the fluorescent screen ($Fl$) of the viewing tube (TVT, FIG. 5), at the considered instant, these electric voltages being applied to the cathodes ($c_r$, $c_v$, $c_b$) of the electron guns of said tube at said instant.

In case of a colored part of the televised scene, hue signal (C), amplified by ($a$C), energizes the "quantized level indicator (I$n$C)" of FIG. 5. This indicator as explained in the applicant's copending U.S. patent application Ser. No. 428,130, filed Jan. 26, 1965 (corresponding to French Pat. No. 1,428,480), comprises 20 groups of two diodes (corresponding to the 20 useful sectors of the Newton color circle of FIG. 2). The diodes of each group are biased by two neighbouring points of a potentiometer comprising a series of resistors energized by a stabilized source of direct current, the diodes of each group being biased through the primary windings of a differential transformer having a ferrite core, (or through the two input resistors of a transistorized differential amplifier). At a given instant, an electric pulse appears *only* at the particular output terminal ($s_i$) of the indicator (I$n$C) which corresponds to the particular quantized value of hue signal (C) at that instant.

Figure 5A:
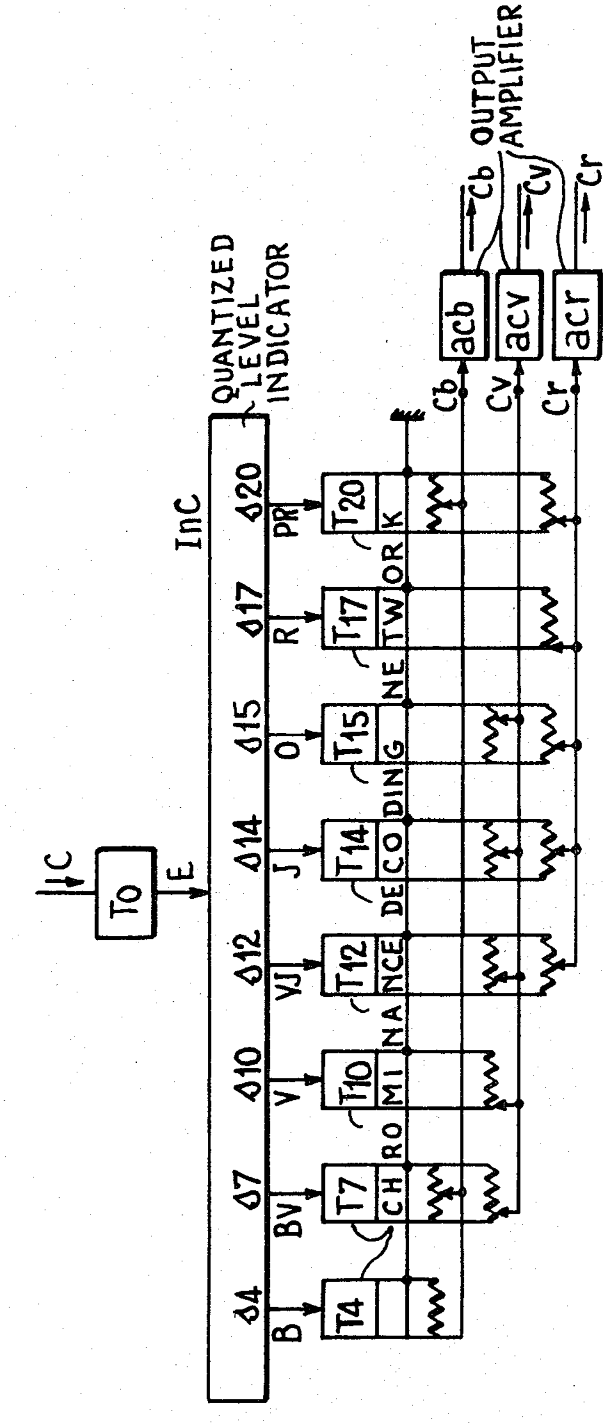
FIG. 5*a* concerns a first embodiment of the quantizing network (InC) of FIG. 5.

FIG. 5*a* represents schematically the quantized level indicator (I$n$C) of FIG. 5. Only the output terminals ($s_4$) for blue (B), ($s_7$) for blueish-green (BV), ($s_{10}$) for green (V), ($s_{12}$) for yellowish-green (VJ), ($s_{14}$) for yellow (J), ($s_{15}$) for orange (O), ($s_{17}$) for red (R), and ($s_{20}$) for red purple (PR), are shown. A field effect transistor ($T_0$) is used for applying hue signal (C) to the input terminal (E) of indicator (I$n$C). Field effect transistors ($T_1$, $T_2$ . . . to $T_{20}$) are also connected at the various output terminals ($s_1$, $s_2$ . . . $s_{20}$) of (I$n$C). These transistors, acting as pentodes, avoid any reaction of the time variations of the internal impedance of (I$n$C) either towards the source of signal (C), or towards the amplifiers ($acb$), ($acv$), ($acr$), which respectively amplify the voltages ($C_b$, $C_v$, $C_r$) produced at the three terminals ($C_b$, $C_v$, $C_r$) of (I$n$C). These voltages are obtained by means of properly adjusted resistors connected at the output of each field effect transistor ($T_1$ . . . $T_{20}$), these adjustments corresponding to a decoding chrominance diagram such as the one represented at the bottom of FIG. 6*d*. These voltages ($C_b$, $C_v$, $C_r$) correspond, for each output terminal ($s_i$) of indicator (I$n$C), to the relative blue, green, red components of the hue characterized by the corresponding quantized value ($C_i$) of hue signal (C).

As shown on FIG. 5, these voltages ($C_b$, $C_v$, $C_r$), at the outputs of ($acb$), ($acv$), ($acr$) are respectively applied to the Wehnelt cylinders ($w_b$, $w_v$, $w_r$) of the three electron guns of picture tube (TVT), which are responsible for the production of fluorescent lights of appropriate intensities and respectively blue, green, red, on each part of the fluorescent screen (Fl) of said tube.

In the case of a white or gray part of the televised scene, no voltage is applied to said Wehnelt cylinders ($w_b$, $w_v$, or $w_r$). Only the voltages (B, V, R), produced by resistor matrix (MR), energize the cathodes ($cb$, $cv$, $cr$) respectively, and the tube (TVT) then operates as a triple cathodyne. In the case of a colored part of the televised scene, the cathodes ($cb$, $cv$, $cr$), energized by voltages (B, V, R) produced by matrix (MR′), and the Wehnelt cylinders ($wb$, $wv$, $wr$), energized by voltages ($C_b$, $C_v$, $C_r$) produced by indicator (I$n$C), cooperate together, in the desired manner, to reproduce, on fluorescent screen (Fl), the color and the brightness of said colored element of the televised scene.

(M) is the perforated mask (within tube TVT) in front of the trichrome fluorescent screen (Fl) and the 3 electron beams (modulated by the cathodes and Wehnelt cylinders, as explained above) converge through one hole of mask (M) before striking 3 neighboring points on the screen (Fl), producing respectively the blue, green and red lights, which, together, produce for the viewer the picture of the corresponding point of the televised scene. The brightness of each red colored point of said scene is always well reproduced, because the received weighted luminance signal ($Y'=Y/S$) is applied to the electrodes controlling the gains of amplifiers ($acb$), ($acv$), ($acr$), as shown on FIG. 5. On said figure (B$h$) and (B$v$) are the magnetic coils energized by relaxation oscillators (O$h$) and (O$v$), respectively synchronized by pulses ($t_1$) and signals ($t_i$) produced by (SVS), said magnetic coils *moving* the three electron beams of tube (TVT), for scanning (horizontally and vertically) fluorescent screen (Fl).

Figure 6:
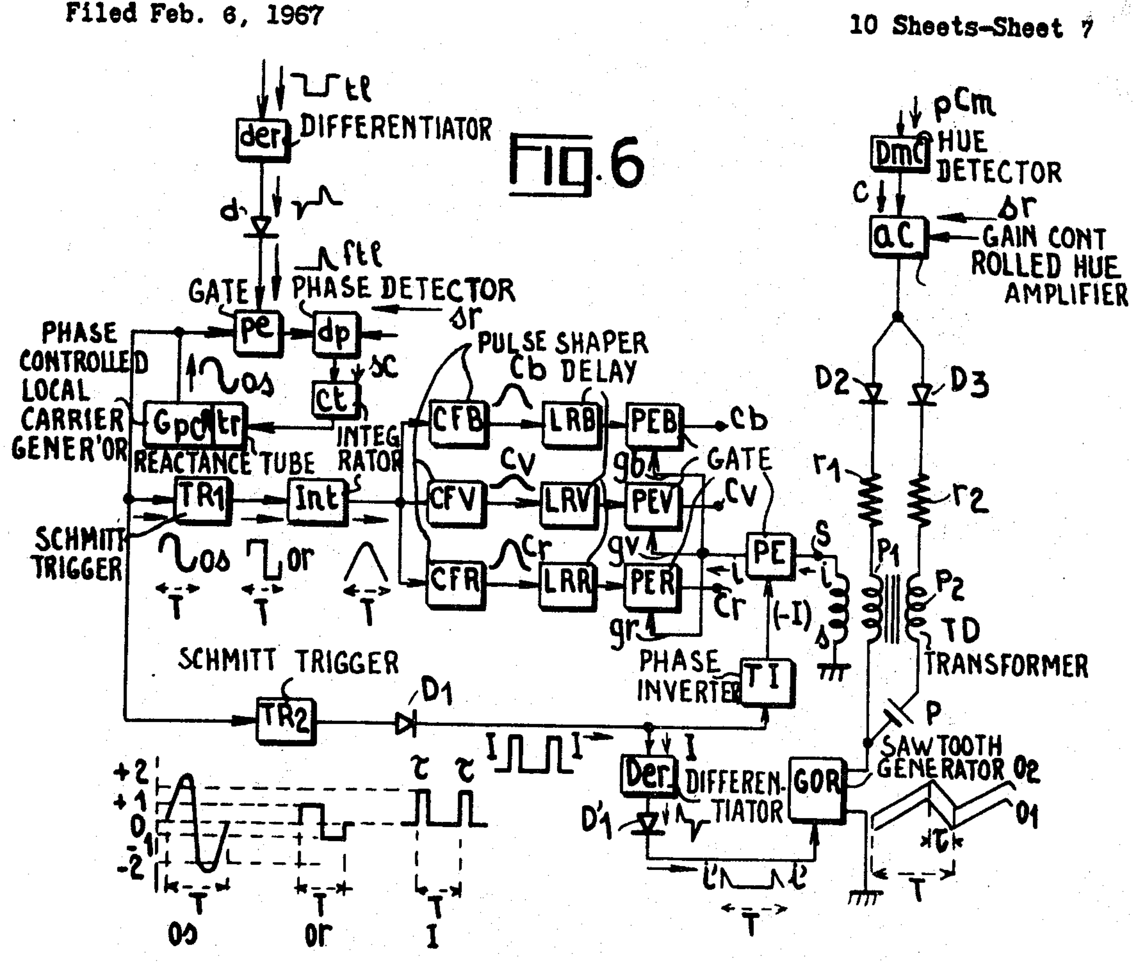
FIGS. 6, 6*a* and, 6*b*, 6*c* show another embodiment of said quantizing network.
Figure 7:
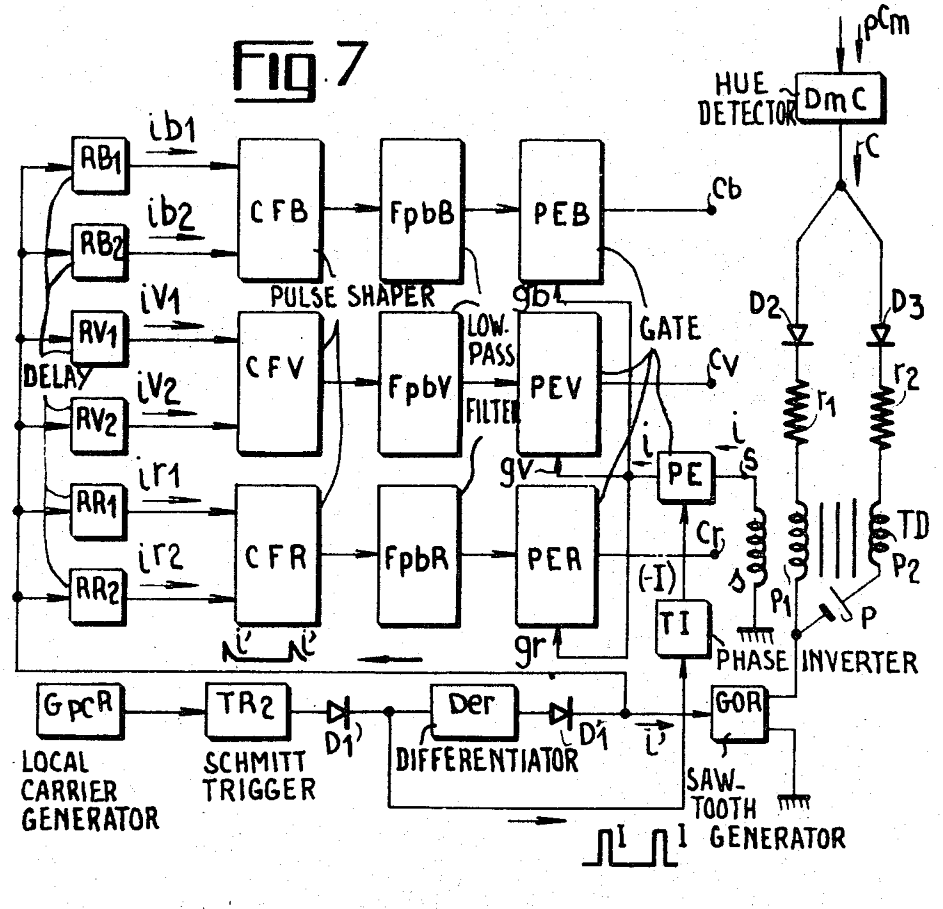

FIGS. 6 and 7 show only those portions of two other embodiments of the receiving station (of the color television system in accordance with the invention), which differ from the corresponding portion of FIG. 5, the remainder of said two embodiments not being reproduced on said FIGS. 6 and 7.

In these two cases, use is made of another type of quantized level indicator for the hue signal (C), and also use is made of two other manners of energizing said indicator.

As shown on FIG. 6, the indicator comprises only *one* group of two diodes ($D_2$, $D_3$), associated with a relaxation oscillator (GOR), which produces two synchronous saw-tooth waves ($O_1$, $O_2$), at the frequency ($pc$) of the color carrier, reproduced by the local oscillator (G$pc$R) of the receiving station. During each period ($T=l/pc$), the saw-tooth ($O_1$) is applied to diode ($D_2$) through the primary winding ($p_1$) of the differential transformer (TD) which has a ferrite core. The other saw-tooth ($O_2$) has the same time position as ($O_1$), and is applied to diode ($D_3$) through the other primary winding ($p_2$) of transformer (TD), and through a battery (P) having an electromotive force equal to the standard quantizing step for hue signal (C), and corresponding to the mapping of Newton-color-circle (FIG. 2).

As the two primary windings ($p_1$, $p_2$) have equal numbers of turns, but are wound in opposite directions, an electric pulse (*i*) appears at the terminal (S) of secondary winding (*s*) of differential transformer (TD), *only* at the instant when the amplitude of the saw-tooth ($O_1$ or $O_2$) coincides (with an approximation equal to quantizing step P) with the value of the hue signal (C) reproduced, at said instant, at the output of amplifier (*a*C), which is energized by the received chrominance signal (*pCm*) through amplitude detector (D*m*C), the gain of amplifier (*a*C) being automatically controlled by the received color burst (*sr*), in order to automatically compensate for the random time variations of the channel connecting the receiving station (FIG. 6) to the transmitting station (FIG. 4).

(PE) is an electronic gate which is normally open, but which closes during the short duration ($\tau$) of the falling part of each saw-tooth ($O_1$ or $O_2$). (PEB), (PEV) and (PER) are three electronic gates which are normally closed, and which open only when pulse (*i*), produced by the secondary winding of (TD), is applied to their respective gating electrodes (*gb, gv, gr*). As explained hereafter, at the instant when pulse (*i*) is produced, three three electric voltages ($C_b$, $C_v$, $C_r$), corresponding to the blue, green, red components of the hue of the color to be reproduced on the trichrome fluorescent screen of the viewing tube (TVT, FIG. 5), appear at the terminals ($C_b$), ($C_v$), ($C_r$) of FIG. 6.

Use is made of the front (*ftl*) of each line synchronizing pulse ($t_1$), and of the received color burst (*sr*), for synchronizing (in frequency and in phase) local oscillator (G*pc*R) with the oscillator at the remote transmitting station which produces, the color carrier of period $T=l/pc$.

The line-synchronizing pulse ($t_1$) is applied to differentiating circuit (*der*) followed by diode (*d*), to produce the short pulse (*ftl*), which opens electronic gate (*pe*), so that the sine wave (*os*) of frequency (*pc*), produced by (G*pc*R), reaches the first input of phase detector (*dp*), whereas the second input is energized by received colorburst (*sr*). There is thus produced, at the output of (*dp*), the correcting signal (*sc*), acting (through a circuit (*ct*) having an appropriate time constant) upon the reactance tube (*tr*) of oscillator (G*pc*R).

The sine wave (*os*) of period T, produced by (G*pc*R) and so synchronized in phase and frequency, energizes the Schmitt trigger ($TR_2$) which is adjusted at the level 2 shown at the bottom (on the left) of FIG. 6. ($TR_2$) is followed by diode ($D_1$), the output of which is a sequence of positive pulses (I) at the frequency ($pc=l/T$) of the color-carrier, each pulse (I) having the duration ($\tau$) of the falling part of the saw-teeth ($O_1$, $O_2$) generated by (GOR). These pulses (I), on one hand, synchronize the relaxation oscillator (GOR) with the sine wave generator (G*pc*R), and, on the other hand, through inverting triode (TI), close the electronic gate (PE) during the falling part of each saw-tooth ($O_1$, $O_2$). The level 2, to which ($TR_2$) is adjusted, is determined in order to cancel wave (*os*) precisely during the part ($\tau$) of each period (T) of the color-carrier, and the width of the arc corresponding to the unused sector of Newton-color-circle (hatched on FIG. 2) is also a portion $\tau/T$ of the circumference of said circle. Therefore, the beginning and the end of the rising part of each saw-tooth ($O_1$, $O_2$) correspond to the values 1 and 20 of hue signal (C), related to violet-purple (PV) and red purple (PR), sectors numbered 1 and 20 on FIG. 2.

In order to synchronize (GOR) with (G*pc*R), each pulse I is applied to differentiating circuit (D*er*) followed by diode ($D'_1$), and the short pulses (*i'*), spaced by the period T of the color carrier, obtained at the output of ($D'_1$), synchronize relaxation oscillator (GOR).

Figure 6A:
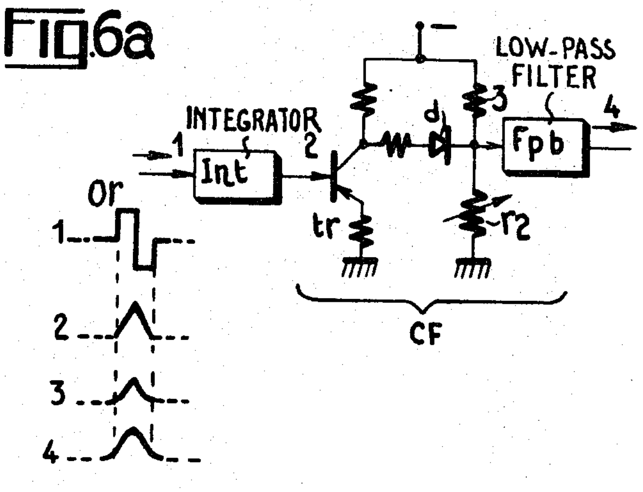
Figure 6B:
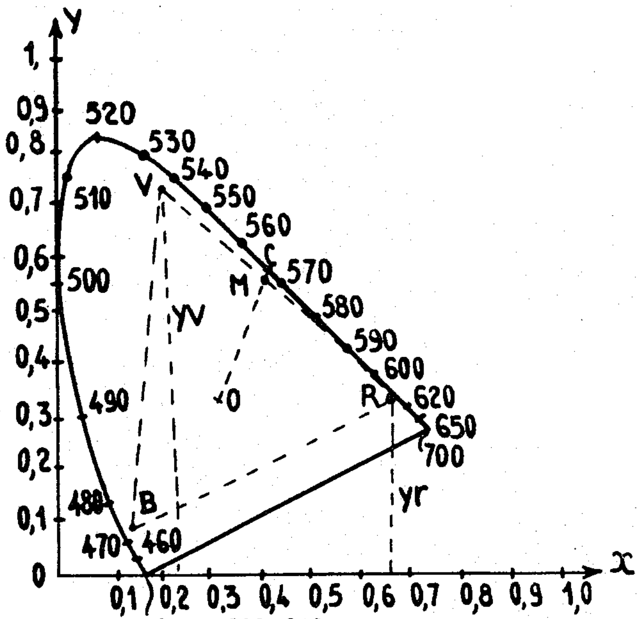
FIGS. 6*d*, 7, 7*a* and, 7*b* illustrate a further embodiment of said quantizing network.
Figure 6B:
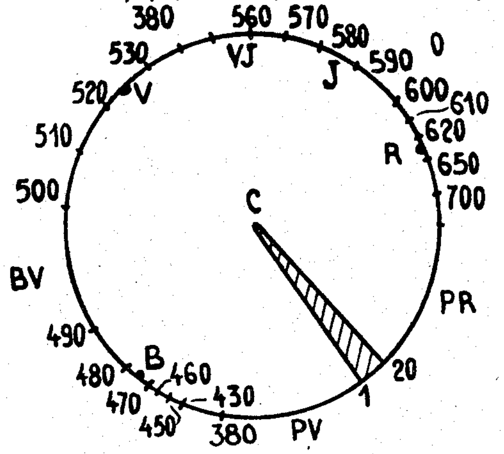

FIG. 6*b* shows, at the top, the color triangle of the International Illumination Committee, in rectangular coordinates (*x, y*), and, at the bottom, the Newton-color-circle. O in said triangle, and the center C of said circle, correspond to white. The "spectrum locus" within said triangle, and the circumference of said circle, are both graduated in millimicrons, the two ends of the spectrum locus (which are also the ends of the "purple-line") corresponding to 380 and 700 millimicrons (extremes blue and red monochromatic radiations). Points B, V, R, within the color triangle, correspond to the "primary-colors" (blue, green, red) generally used in color television. Along the Newton circle: PV indicates violet purple—B, blue—BV, cyan—V, green—VJ, yellowish green—J, yellow—O, orange—R, red—PR, red purple. For imitating the hue (monochromatic radiation) represented by a point (C) of the spectrum locus (FIG. 6*b*, at the top), the crossing point (M) between OC and VR is generally considered as the center of gravity of two masses—one equal to (*Lv/yv*) applied at point V, and the other equal to (*Lr/yr*) applied at point R, with (L*v*) and (L*r*) being the intensities of green light and red light to be mixed together in order to produce the color represented by point M, and which is very similar to the monochromatic (yellowish-green) radiatiton represented by point C. Applying the law of gravity $$\left(\frac{lr}{yr}MR=\frac{Lv}{yv}MV\right)$$

the following formula is obtained:

$$\frac{Lv}{Lr}=\frac{yv}{yr}\times\frac{MR}{MV}$$

This determines the ratio of the green and red components (*Cv/Cr*) of the hue signal (C) corresponding to the color represented by M (or by C) in the color triangle.

Figure 6C:
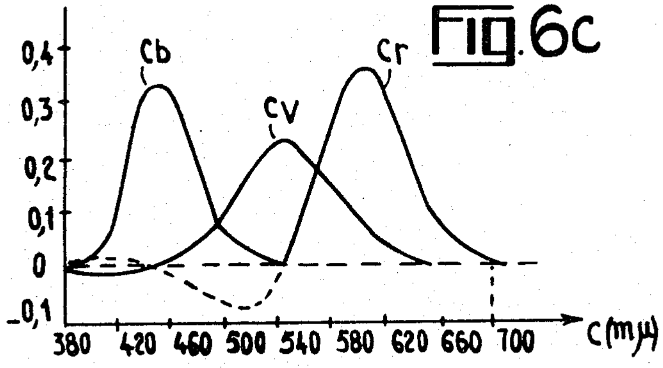

In this manner it is possible to trace the three curves $C_b$, $C_v$, $C_r$ of FIG. 6*c*, representing (in abcissa) the wavelength (in millimicrons) of a given hue (monochromatic radiation), and, in ordinate, the relative value of the blue, or green, or red component of the corresponding hue signal (C). Similar curves can be traced for the purple colors corresponding to the various points of the "purple line" in the color triangle (FIG. 6*b*).

Figure 6D:
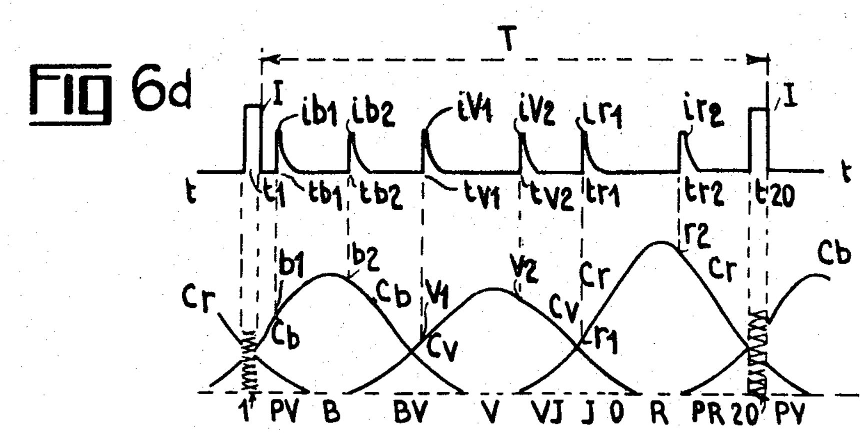

By neglecting the dotted negative parts of curves ($C_b$, $C_v$, $C_r$) for monochromatic radiations (FIG. 6*c*), and combining this diagram of FIG. 6*c* with a similar diagram (not shown) for purple colors, the diagram shown at the bottom of FIG. 6*d* is obtained. Assuming that, during each period T of the color carrier, the circumference of the Newton color circle (of FIG. 6*b*), is described, going from point 1 to point 20, the various steps (from PV to PR) of this motion are shown as abscissa on FIG. 6*d*, whereas the ordinates given the relative values ($C_b$, $C_v$, $C_r$) of the blue, green, and red components of the corresponding hue signals (C), while the hatched portions of FIG. 6*d* correspond to the unused sector of the color circle (FIG. 2, or FIG. 6*b* at the bottom).

FIG. 6*d* is, now, hereafter, considered as the oscillogram of one period T of a sequence of positive pulses (having the long shapes of curves $C_b$, $C_v$, $C_r$ respectively). Assuming that these pulses (spaced in time, as shown on FIG. 6*d*, relatively to each other) are applied to the input of electronic gates (PEB), (PEV), (PER) of FIG. 6, the correct values of the electric voltages ($C_b$, $C_v$, $C_r$) corresponding to hue signals (C) will be produced at terminals ($C_b$, $C_v$, $C_r$) of FIG. 6, at each instant when a short pulse (*i*) is produced at the output (S) of the quantized level indicator, energized by the received chrominance signal (*pCm*) which is the color carrier amplitude-modulated by said hue signal (C).

In order to produce this sequence of pulses ($C_b$, $C_v$, $C_r$), a period (T) of which is represented by the oscillogram at the bottom of FIG. 6*d*, use is made of the electronic circuit shown in the middle of FIG. 6.

A Schmitt trigger ($TR_1$), adjusted at the level 1 shown at the bottom on the left of FIG. 6, is energized by sine wave (*os*) of oscillator (G*pc*R), and produces the rectangular wave (*or*) of the same period (T) as the color carrier and which is shown on line 1 of FIG. 6*a*. This square wave (*or*) energizes an integrating circuit (I*nt*), producing a triangular wave of period (T), shown on line 2 of FIG. 6*a*, which is applied in parallel to three pulse-shapers (CFB), (CFV), (CFR). At the outputs of said pulse-shapers are obtained positive bell-shaped pulses ($C_b$, $C_v$, $C_r$, FIG. 6), reproducing faithfully those having the same designations on FIG. 6*d*. (LRB), (LRV), (LRR) are time-delay circuits producing the delays required for giving, to said bell-shaped pulses ($C_b$, $C_v$, $C_r$, FIG. 6), the same relative time positions as those pulses having the same designations on FIG. 6*d*.

These positive pulses ($C_b$, $C_v$, $C_r$), produced at the outputs of said time delay circuits, reach the electronic-gates (PEB) (PEV) (PER), which open at the instant when the short positive pulse (*i*), produced at the terminal (S) of the secondary winding of differential transformer (TD), is applied to their respective gating electrodes ($g_b$, $g_v$, $g_r$). At this instant, in accordance with oscillogram of FIG. 6*d*, electric voltages ($C_b$, $C_v$, $C_r$) will appear at the terminals labelled ($C_b$), ($C_v$), ($C_r$) on FIG. 6, and these voltages will correspond precisely to the blue, green, red components of the hue of the color of the element of the televised scene being scanned at said instant.

FIG. 6*a* shows a first type of pulse-shaper (CF) which could be used for designing the shapers (CFB), (CFV) and (CFR) of FIG. 6. The triangular wave (line 2 at the left of FIG. 6*a*), produced at the output of the integrating circuit (I*nt*, FIG. 6, or FIG 6*a*), takes the shape shown on line 3 at the left of FIG. 6*a* after having gone through the electronic circuit comprising transistor ($t_r$) followed by diode (*d*) which is associated with fixed resistors and with adjustable resistor ($r_2$). Then low-pass frequency filter (F*pb*) enlarge the base and rounds the top of the pulse, thus producing a pulse, shown on line 4 (FIG. 6*a*), in form of a bell, such as pulses $C_b$, $C_v$, $C_r$ of FIG. 6*d*.

Various modifications on the electronic circuit of FIG. 6 can be made, while remaining within the scope of the invention. For example, instead of the differential transformer with ferrite core (TD), a transistorised differential-amplifier could be employed. The two inputs of the amplifier would replace the primary windings of (TD), and the output circuit would replace the secondary winding of (TD).

A rather different electronic circuit, using a different type of pulse-shaped, is shown on FIG. 7, but fulfills the same function as the circuit of FIG. 6. On FIG. 7, the short positive pulses (*i'*), which synchronize relaxation oscillator (GOR) with the sine wave oscillator (G*pc*R), are applied, through appropriate pulse delay means ($RB_1$, $RB_2$), ($RV_1$, $RV_2$) and ($RR_1$, $RR_2$), to pulse-shapers (CFB), (CFV), (CFR), of the type illustrated by FIG. 7*b*. These pulse-shapers are followed by low-pass frequency filters (F*pb*B), (F*pb*V) and (F*pb*R), in order to reproduce the elements ($C_b$, $C_v$, $C_r$) of the oscillogram shown at the bottom of FIG. 6*d*, which are then applied to electronic gates (PEB), (PEV), and (PER) respectively. Again, these gates open only when pulse (*i*), produced at the output (S) of the secondary winding of transformer (TD) is applied to their respective gating electrodes (*gb, gv, gr*).

Figure 7B:
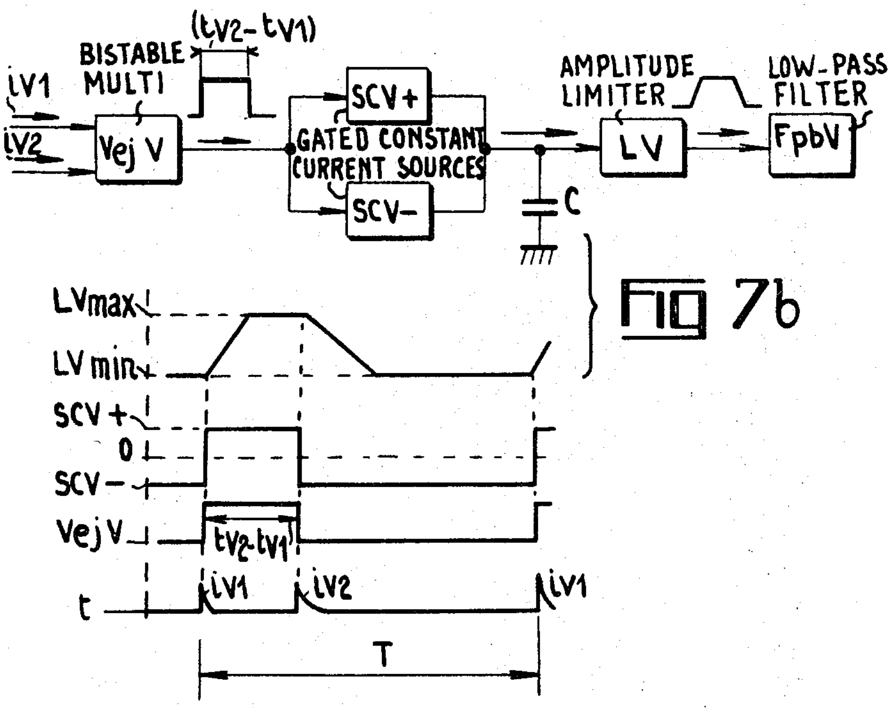
Figure 7A:
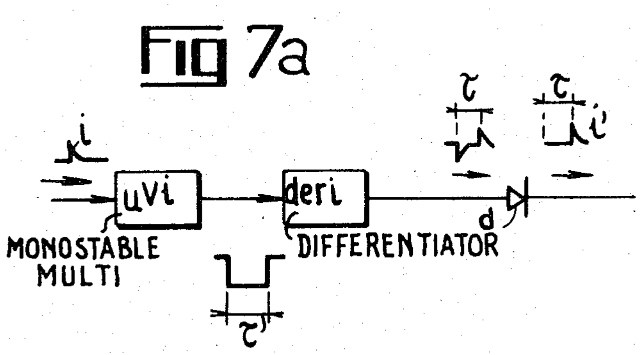

FIG. 7*a* illustrates the principle of the pulse delay means of FIG. 7, and FIG. 7*b* illustrates the principle of the pulse-shapers of FIG. 7.

On FIG. 7*a*, the short positive pulse (*i'*, of FIG. 7) energizes the monostable vibrator (*uvi*), comprising a resistor and a capacitor of such values that, at the output of (*uvi*), is obtained a rectangular pulse having a duration ($\tau$) equal to the desired delay to be produced; this rectangular pulse is applied to a differentiating circuit (*deri*), followed by a diode (*d*), in order to finally obtain a short positive pulse (*i'*) retarded by ($\tau$) with reference to the input pulse.

FIG. 7*b* represents pulse-shaper (CFV) of FIG. 7, taken as an example. The pulse to be produced, beyond (CFV) followed by low-pass frequency filter (F*pb*V), should have the same shape, and the same time position within the period T of the color carrier, as the pulse (C*v*) in the oscillogram shown at the bottom of FIG. 6*d*. The time scale, within a period T of the color carrier, is shown at the top of FIG. 6*d*, the origin ($t_1$) being the end of the pulse (I) produced at the output of diode $D_1$ on FIG. 7, and coinciding with the starting point (*l*) of an assumed motion along the circumference of the Newton color circle (FIG. 6*b*, at the bottom) taking place during every period T of the color carrier.

The pulse delay means ($RV_1$) and ($RV_2$) on FIG. 7 are built for producing delays ($tv_1-t_1$) and ($tv_2-t_1$) for any pulse (*i'*) applied at their respective inputs. The short pulses, thus delayed and successively applied to pulse-shaper (CFV), are designated ($iv_1$ and $iv_2$) on FIGS. 6*d*, 7 and 7*b*. Referring now to FIG. 7*b*, these pulses determine the two stable states of the Eccles-Jordan flip-flop labelled (V*ej*V) on FIG. 7*b*. This flip-flop produces, at its output, a rectangular pulse having a duration equal to ($tv_2-tv_1$) and shown on the second line at the bottom of FIG. 7*b*, at the left side (line labelled V*ej*V).

On FIG. 7*b*, (SCV+) and (SCV−) represents constant current sources operating at the positive and negative levels labelled respectively (SCV+) and (SCV−) on the third line, at the lower left of FIG. 7*b*. These sources may be pentode tubes, or field-effect transistors operating like pentodes, or they may be made of two silicon transistors having a common base, receiving their emitter currents through large resistors connected to positive and negative sources. Instead of large resistors, use could be made of resistors kept constant by means of Zener diodes.

Assuming that such a group of two transistors is used, the first stable state of flip-flop (V*ej*V), determined by the first input short pulse ($iv_1$), will control the conductivity of the transistor loading capacitor (C) of FIG. 7*b* in order to produce the ascending part of the positive trapezoidal pulse shown on the fourth line at the bottom of FIG. 7*b* (at left). The second stable state of flip-flop (V*ej*V), determined by the second input short pulse ($iv_2$), will control the conductivity of the transistor loading capacitor C, in order to produce the falling part of said trapezoidal positive pulse. (LV) on FIG. 7*b* represents an amplitude filter limiting the maximum of said ascending part of pulse to the level (LV max) shown at left of said FIG. 7*b*, and also limiting the minimum of said falling part of pulse to the level (LV min) shown also at the left of said FIG. 7*b*. Finally (F*pb*V), on FIGS. 7 and 7*b*, represents a low-pass frequency filter which rounds the top of the positive trapezoidal pulse, and which enlarges somewhat the base of said pulse, in order to finally obtain the desired bell-shaped pulse (C*v*) shown in the oscillogram of FIG. 6*d*.

In accordance with the method illustrated by FIG. 7*b*, the sequence of pulses *Cb*, *Cv*, *Cr* shown on FIG. 6*d*, is produced during each period T of the color carrier, pulses $C_b$ reaching terminal ($C_b$) of FIG. 7 when electronic gate (PEB) opens, whereas pulses $C_v$ and $C_r$ reach respectively terminals ($C_v$) and ($C_r$) when electronic gates (PEV) and (PER) open.

What I claim is:

1. In a color television system, a transmitting arrangement comprising:

a set of color pickup tubes having means for scanning a scene in a plurality of colors;

first means for developing a luminance signal indicative of the degree of brightness of a scanned area of the scene;

second means for developing a chrominance signal indicative of the color of the scanned area, said chrominance signal including a hue component represenitng the hue as referred to a scale of hus values and a saturation component representing the degree of saturation of color;

third means for combining said luminance signal and the saturation component of said chrominance signal for developing a so-called weighted luminance signal representing said degree of brightness reduced in proportion to said degree of saturation;

fourth means for developing a hue signal from said hue component of the chrominance signal;

selector means controlled by said hue signal for establishing a first circuit condition in the substantial absence of a chrominance signal indicating that the scanned area is colorless, and establishing a second circuit condition in the substantial presence of a chrominance signal;

transmission means having inputs and including means for transmitting signals applied to its input over a communication link;

means for applying the color carrier amplitude modulated by the hue signal to an input of the transmission means and means controlled by said selector means for applying said luminance signal to an input of the transmission means in said first circuit condition and for applying said weighted luminance signal to an input of the transmission means in said second circuit condition;

whereby to transmit said color carrier modulated by signal during the scanning of a color area of the scene, and transmit said luminance signal during the scanning of a colorless area of the scene.

2. A receiving arrangement adapted for cooperating with a transmitting arrangement including a communication link, and means for developing hue, luminance, weighted luminance, and chrominance signals, said receiving arrangement comprising:

means coupled to said communication link for receiving said hue signal and said luminance signal or said weighted luminance signal;

cathode-ray tube means having color control input means and brightness control input means;

means for deriving from the received hue signal a set of chromatic component signals;

color control means for applying said chromatic signal set to said color control input means of the cathode-ray tube means;

selector means controlled by said hue signal for establishing a first circuit condition in the absence of an effective hue signal and a second circuit condition in the effectve presence thereof; and means controlled by said selector means for applying the blue, green and red components of the received luminance signal to said brightness control input means of the cathode-ray tube means in said first circuit condition and applying the blue, green and red components of the received weighted luminance signal to said brightness control input means in said second circuit condition.

3. A color television system comprising in a cooperating combination a transmission assembly and a reception assembly wherein the transmission assembly comprises:

a set of color pickup tubes having means for scanning a scene in a plurality of colors;

first means connected for developing a luminance signal indicative of the degree of brightness of a scanned area of the scene;

second means connected for developing a chrominance signal indicative of the color of the scanned area, said chrominance signal including a hue component representing the hue as referred to a scale of hue values and a saturation component representing the degree of saturation of color;

third means connected for combining said luminance signal and the saturation component of said chrominance signal for developing a so-called weighted luminance signal representing said degree of brightness reduced in proportion to said degree of saturation;

fourth means connected for developing a hue signal from said hue component of the chrominance signal;

selector means connected for establishing a first circuit condition in the substantial absence of a chrominance signal indicating that the scanned area is colorless, and establishing a second circuit condition in the substantal presence of a chrominance signal;

transmission means having inputs and including means for transmitting signals applied to its input over a communcation link;

means connected for applying the color carrier amplitude modulated by the hue signal to an input of the transmission means; and means controlled by said selector means for applying said luminance signal to an input of the transmission means in said first circuit condition and for applying said weighed luminance signal to an input of the transmission means in said second circuit condition;

whereby to transmit said color carrier modulated by the hue signal together with said weighted luminance signal during the scanning of a color area of the scene, and transmit said luminance signal during the scanning of a colorless area of the scene;

and further wherein the reception assembly comprises:

means coupled to said communication link for receiving said hue signal and said luminance signal or said weighted luminance signal;

cathode-ray tube means having color control input means and brightness control input means;

means connected for deriving from the received hue signal a set of chromatic component signals;

color control means connected for applying the chromatic signal set to said color control input means of the cathode-ray tube means;

selector means controlled by said hue signal for establishing a first circuit condition in the absence of an effective hue signal and a second circuit condition in the effective presence thereof; and means controlled by said selector means for applying the received luminance signal to said brightness control input means of the cathode-ray tube means in said first circuit condition and applying the blue, green and red components of the received weighted-luminance signal to said brightness control input means in said second circuit condition.

4. A transmitting arrangement as claimed in claim 1, wherein said means for applying the color carrier modulated by the hue signal includes a suppressed-carrier single side-band compatible-modulator.

5. A transmitting arrangement as claimed in claim 1, wherein said transmission means includes a sound signal input, and means applying a sound signal thereto for transmission over a common communication channel with said hue and weighted-luminance signal during the scanning of a colored area and with said luminance signal during the scanner of a colorless area.

6. A transmitting arrangement as claimed in claim 1, wherein said second and fourth means comprises:

matrix means having inputs connected to said color pickup tubes and having at least two outputs, each producing a chrominance component;

quadrature modulator means connected to said two outputs of the matrix means for delivering said chrominance signal as an amplitude and phase-modulated signal wherein the amplitude represents the product of saturation-degree and luminance and the phase represents hue;

phase detector circuitry for receiving said chrominance signal and delivering a variable-amplitude sgінal representing said hue; and amplitude-modulating circuitry having a modulating input connected to receive said variable amplitude hue signal and delivering an amplitude-modulated color carrier.

7. A transmitting arrangement as claimed in claim 6, wherein said matrix means has a further output for delivering said luminance signal.

8. A transmitting arrangement as claimed in claim 3, wherein said first means comprises a black-and-white pick-up tube and said latter delivers said luminance signal.

9. A transmitting arrangement as claimed in claim 3, wherein said third, combining means comprises:
- amplitude-detector circuitry for receiving said chrominance signal and delivering a variable-amplitude signal representing said product of saturation-degree and luminance;
- and divider circuitry for receiving said product signal and said luminance signal and delivering said weighted-luminance signal as the ratio of the luminance signal over the color saturation degree.

10. A transmitting arrangement as claimed in claim 8, wherein said third, combining means comprises:
- amplitude-detector circuitry for receiving said chrominance signal and delivering a variable-amplitude signal representing said product of saturation-degree and luminance;
- a divider circuit for receiving said product signal and said luminance signal and delivering a variable-ampltude signal representing said saturation-degree; and
- variable-gain means having a signal input for receiving said luminance signal and having a gain-varying input for receiving the saturation degree signal from said divider circuit and delivering said weighted luminance signal as representing said luminance signal reduced in strength in proportion to the color saturation degree.

11. A transmitting arrangement as claimed in claim 1, wherein said selector means comprises gating means having a gating control input for receiving said variable-amplitude hue signal so as to establish said first circuit condition when the hue signal amplitude is substantially zero and said second circuit condition when the hue signal amplitude is of a substantial level.

12. A receiving arrangement as claimed in claim 2, further comprising:
- variable-gain means for modifying the effective strength of the set of chromatic component signals as applied from said deriving means to said color control input means; and
- means connected to the gain-varying input of said variable-gain means for varying the gain thereof in proportion to said weighted-luminance signal in said second circuit condition of said selector means.

13. A receiving arrangement as claimed in claim 2, wherein the means for deriving the set of chromatic component signals comprises a quantizing network having an input receiving the hue signal and a plurality of outputs corresponding in number to the number of quantized hue values, said outputs selectively energizable in accordance with the value of said received hue signal, and a chrominance-decoding impedance network having a plurality of inputs respectively connected to the outputs of said quantizing network and having a set of outputs corresponding in number to said set of chromatic component signals, said decoding network being predetermined to combine the voltages appearing at the energized outputs of said quantizing network into a set of output signals representing the color components of the received hue signal value.

14. A receiving arrangement as claimed in claim 2, wherein the means for deriving the set of chromatic component signals comprises:
- means producing a sawtooth sweep signal at the frequency of the carrier wave for said hue signal;
- means defining a set of color channels including pluse shaper means and delay means for producing, at an output of each channel, a bell-shaped waveform within each cycle of said carrier wave, said waveforms corresponding, in shape and timing within said cycle, to the shape and wavelength position, within the spectrum of said hue values, of the bell-shaped spectral curves representing the color components for each hue value in said spectrum;
- gating means associated with said channels; and
- amplitude-comparison means for receiving said hue signal and said sawtooth sweep signal and connected to said gating means for enabling the latter to pass said waveforms to the respective channel outputs on substantial agreement between the amplitude levels of said hue signal and sweep signal;
- whereby said channel outputs will deliver respective signals representing the color components of the received hue signal value.

15. A receiving arrangement as claimed in claim 14, wherein said amplitude comparison means comprises a pair of diodes, means applying said hue signal to corresponding terminals of both diodes, a differential circuit device connected to the opposite terminals of the diodes and means connecting said sawtooth signal producing means with said device so as to pass to said diodes respective sawtooth waves which are synchronous but differ incrementally in amplitude between each other, the output of said device being connected to said gating means for enabling the latter to pass said waveforms to the respective channel outputs as the two sawtooth waves reach respective amplitude values encompassing the amplitude value of the received hue signal.

16. A receiving arrangement as claimed in claim 2, wherein said cathode-ray tube means comprises a multi-gun color tube having beam-producing and beam-intensity-controlling electrodes associated with each gun thereof, said brightness control input means comprising the beam-producing electrodes of the respective guns, and said color control input means comprising the beam-intensity-controlling electrodes of the respective guns.

References Cited

UNITED STATES PATENTS

| | | | |
|---|---|---|---|
| 2,920,131 | 1/1960 | Valensi | 178—5.2 |
| 2,982,811 | 5/1961 | Valensi | 178—5.2 |

ROBERT L. GRIFFIN, Primary Examiner

A. H. EDDLEMAN, Assistant Examiner